United States Patent [19]

Hunt

[11] 4,305,282

[45] Dec. 15, 1981

[54] METER INSTALLATION FOR UNDERGROUND PIPELINES

[76] Inventor: Mitchell Hunt, Rte. 11, P.O. Box 108, Bowling Green, Ky. 42101

[21] Appl. No.: 133,354

[22] Filed: Mar. 24, 1980

[51] Int. Cl.³ .............................................. G01F 15/18
[52] U.S. Cl. ......................................... 73/201; 73/273
[58] Field of Search .................................. 73/201, 273

[56] References Cited

U.S. PATENT DOCUMENTS

| 3,935,736 | 2/1976 | Enright | 73/201 |
| 3,961,528 | 6/1976 | Ford | 73/201 |

*Primary Examiner*—Donald O. Woodiel
*Attorney, Agent, or Firm*—Parmelee, Johnson, Bollinger & Bramblett

[57] ABSTRACT

The present invention provides an improved meter installation for a deep underground pipeline employing a meter pit. Pre-coiled, flexible tubing lengths are coupled between the ends of the pipeline in the pit and a flowmeter which is also housed within the pit. The meter is vertically movable within the pit. As the meter is raised, the pre-coiled tubing uncoils or expands, and as the meter is lowered, the pre-coiled tubing re-coils or contracts.

The meter installation of this invention is particularly useful for water metering in pipelines laid a substantial depth below ground level—as, for example, in cold plains states. The present system provides a meter reader, repairman, or the like, with ready access to the meter without the necessity of physically entering the pit. The meter is easily raised to ground level without interrupting the flow of liquid therethrough.

10 Claims, 3 Drawing Figures

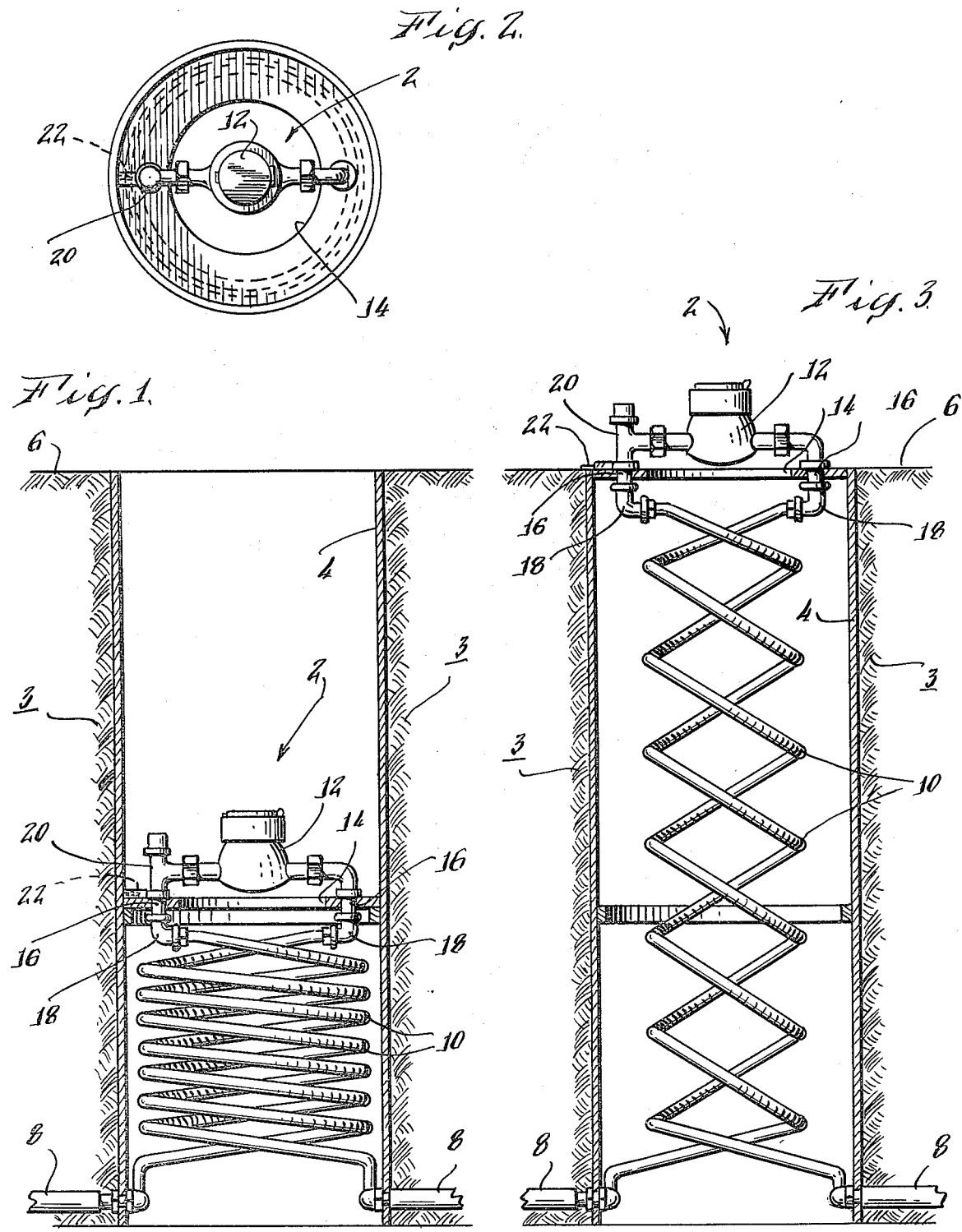

METER INSTALLATION FOR UNDERGROUND PIPELINES

BACKGROUND OF THE INVENTION

The present invention relates to an improved meter installation of the type having a meter connected in a pipeline passing through a meter pit beneath the surface of the earth. The improved metering system provides ready access to the meter within the pit and eliminates the necessity of the party seeking access to the meter to physically descend into the pit.

In geographical areas in which the prevailing temperature is below the freezing level a substantial portion of the year, liquid pipelines, particularly water lines, are laid a sufficient depth below the earth's surface to prevent freezing of the liquid carried by the pipelines. In practice, such pipes may often be laid as much as ten feet below ground level. In order to monitor liquid flow, flow meters are coupled to the pipeline at selected positions. For example, a meter is normally installed in the line leading from a water main to a residential, commerical, or industrial user. Lined meter pits are provided at such selected locations so that access to the meters can be had from ground level. When the meter is to be read, inspected, repaired, or replaced, the person performing the operations must physically descend into the pit to gain access to the meter.

One disadvantage of the known metering system as discussed above is that it is potentially dangerous for a person to descend into a pit beneath the earth's surface. Such metering systems also are uneconomical because the pit lining must be constructed sufficiently wide to accommodate a human body. Additionally, the efficiency of a workman servicing the meter is impeded since the work must be performed within the confined space of the pit.

It is an object of the present invention to provide an improved, economical, liquid metering system which provides ready access to a meter within a pit without requiring a workman to physically descend into the pit.

SUMMARY OF THE INVENTION

The present invention provides an improved underground meter installation of the type in which a fluid meter is coupled to an underground pipeline in a lined meter pit. The pipeline extends through the pit, and pre-coiled, flexible tubing is connected into the pipeline. A flow meter is coupled to the pre-coiled tubing and means are provided to raise and lower the meter within the pit. As the meter is raised towards ground level, the tubing uncoils to accommodate the movement of the meter. Conversely, as the meter is lowered, the tubing recoils.

The improved meter installation provides access to the meter without the necessity of physically entering the pit. The meter may be raised to ground level without interrupting the flow of liquid therethrough. Although the metering system is discussed primarily with respect to underground water lines, the new system can be advantageously used in connection with the metering of any fluid medium.

BRIEF DESCRIPTION OF THE DRAWINGS

FIG. 1 is a cross-sectional, elevational view of an improved meter installation in accordance with the invention showing the meter in its lowered position;

FIG. 2 is a plan view of the installation of FIG. 1; and

FIG. 3 is a view similar to FIG. 1 showing the meter in its raised position.

DETAILED DESCRIPTION OF THE PREFERRED EMBODIMENT

Referring to FIGS. 1 and 2, a pit 2 is shown extending below the surface of the earth 3. The circumference of the pit is defined by a tubular liner 4 which may be, for example, of the one piece extruded type disclosed in copending application Ser. No. 75,895 filed Sept. 17, 1979 and assigned to the same assignee as the present invention. Ground level is indicated by the numeral 6, and a pipeline 8, laid below ground level, extends into the pit through suitable openings in the liner 4.

In practice, if the underground pipeline 8 is used to carry water in a cold plains area, it may be laid as much as ten to twelve feet below ground level in order to keep it below the frost line. Otherwise, water within the pipeline might freeze, thus impeding water flow and possibly rupturing the pipeline.

The two ends of pipeline 8 within the meter pit 2 are open and thus not directly connected to each other. Two lengths of pre-coiled flexible tubing 10 within the meter pit are connected to the respective ends of pipeline 8. The pre-coiled tubing 10 can be, for example, formed from polyethylene or nylon. A flow meter 12 is connected between the pre-coiled lengths of tubing 10 to record fluid flow through the tubing, and thus also the flow through the pipeline 8. The flow meter is mounted towards the top of the coiled tubing. A platform 14 supports the flow meter 12, and suitable openings 16 are defined in the platform to couple portions of the tubing 10 to the fluid meter carried atop the platform. Couplings 18 are provided for this purpose, and a valve (or "curb stop") 20 is provided on the meter to selectively stop fluid flow through the tubing to enable workmen to perform any necessary repair or replacement of the meter. The platform 14 is annular to permit the upward flow of warm air which results from circulation induced by the temperature differential between the surface and the bottom of the pit.

A latch 22 is slidably mounted to the platform 14. As will be discussed below, this latch, in its extended position, extends beyond the top of liner 4 of the meter pit to retain the platform 14 at approximately ground level when the platform is raised to that elevation. In the alternative, a bar can be wedged underneath the supporting platform to retain it at ground level.

As shown in FIG. 1, the platform 14 and the flow meter 12 are in their normal lowermost operating position within the meter pit where they are supported atop the coiled tubing. When access to the flow meter is required for such purposes as meter reading, maintenance, inspection or replacement, a hook is inserted into the meter pit 2 to engage the meter. Once engaged, the hook is lifted to raise the flow meter and its supporting platform to ground level as shown in FIG. 3. As the flow meter and its supporting platform rise, the tubing 10 uncoils to accommodate the upward movement. As the supporting platform reaches ground level, the latch 22 is slid into its extended position to engage the top of the liner 4 in order to retain the platform at ground level. In the alternative, as previously mentioned, a bar can be inserted beneath the supporting platform to retain the platform at ground level. With the platform at ground level, the flow meter carried atop the platform is also at ground level, and any operations to be performed on the flow meter can be done by workmen at ground level without descending into the meter pit 2.

After reading or servicing of the flow meter is complete, latch 22 is slid back towards the platform 14 and out of engagement with the top of the liner 4. The coiling force of the tubing now dominates and tends to lower the platform and flow meter into its lowermost position within the pit. The hook can be used to restrain the recoiling force of the tubing 10 in order to provide a smooth descent of the platform and the flow meter into the meter pit. As the platform and flow meter descend, the tubing 10 recoils. When the tubing is in its completely recoiled position, the platform and flow meter are in their original operating position within the meter pit.

The above discussed invention provides a fluid metering system for underground pipelines that allows access to a flow meter within a meter pit by providing means for raising the flow meter to ground level without interrupting fluid flow therethrough. A workman is not required to physically descend into the pit because all necessary operations on the meter can be performed from ground level. The metering system is economical because meter pits do not have to be constructed sufficiently wide to accommodate a human body, thereby saving labor and materials. Further, the efficiency of workmen servicing the meter is enhanced because the work is actually done at ground level, not within the confined space of the meter pit.

The discussion of the system provided herein is intended to be illustrative only, and not restrictive of the scope of the invention. For example, although the metering system was noted as being particularly useful as a water metering system, the invention is not restricted to such use but is capable of metering different fluids. Also, although the discussed means for raising and lowering the flow meter was described as a hook, other conventional elevating means can be used in conjunction with the present metering system. Accordingly, the scope of the present invention is not intended to be restricted to the discussed embodiment, but is defined only by the following claims and all equivalents thereto.

What is claimed is:

1. Apparatus for installing a surface accessible device in an underground pipe which comprises:
    a tubular liner having a length sufficient to extend from the surface to the level of said pipe;
    coupling means carried by said liner for connection externally thereof to separated ends of said pipe;
    first and second lengths of pre-coiled flexible tubing within said liner, each having a lower end connected to a different end of said pipe and an upper end connectable to said device, said pre-coiled tubing being expandable and contractable in a vertical direction to permit said device to be raised and lowered within said liner while maintaining fluid flow therethrough.

2. Apparatus as claimed in claim 1 wherein said pre-coiled flexible tubing is nylon.

3. Apparatus as claimed in claim 1 wherein said pre-coiled flexible tubing is polyethylene.

4. Apparatus as claimed in claim 1 further including a supporting platform for carrying said device thereon, said supporting platform being vertically movably mounted within said liner.

5. The apparatus of claim 4 wherein said device is a flow meter.

6. Apparatus as claimed in claim 5 wherein said supporting platform is mounted atop said pre-coiled tubing and defines holes through which a portion of said pre-coiled tubing is coupled to said fluid meter thereon.

7. Apparatus as claimed in claim 5 wherein said supporting platform has a further opening for allowing circulation of air within said liner.

8. Apparatus as claimed in claim 5 further including a valve coupled to said fluid meter above said supporting platform.

9. Apparatus as claimed in claim 5 further including means for retaining said supporting platform at approximate ground level at the top of said meter pit.

10. Apparatus as claimed in claim 1 wherein said pre-coiled flexible tubing exerts a force on said fluid meter in the direction of contraction of said tubing.

* * * * *